Figure 1:
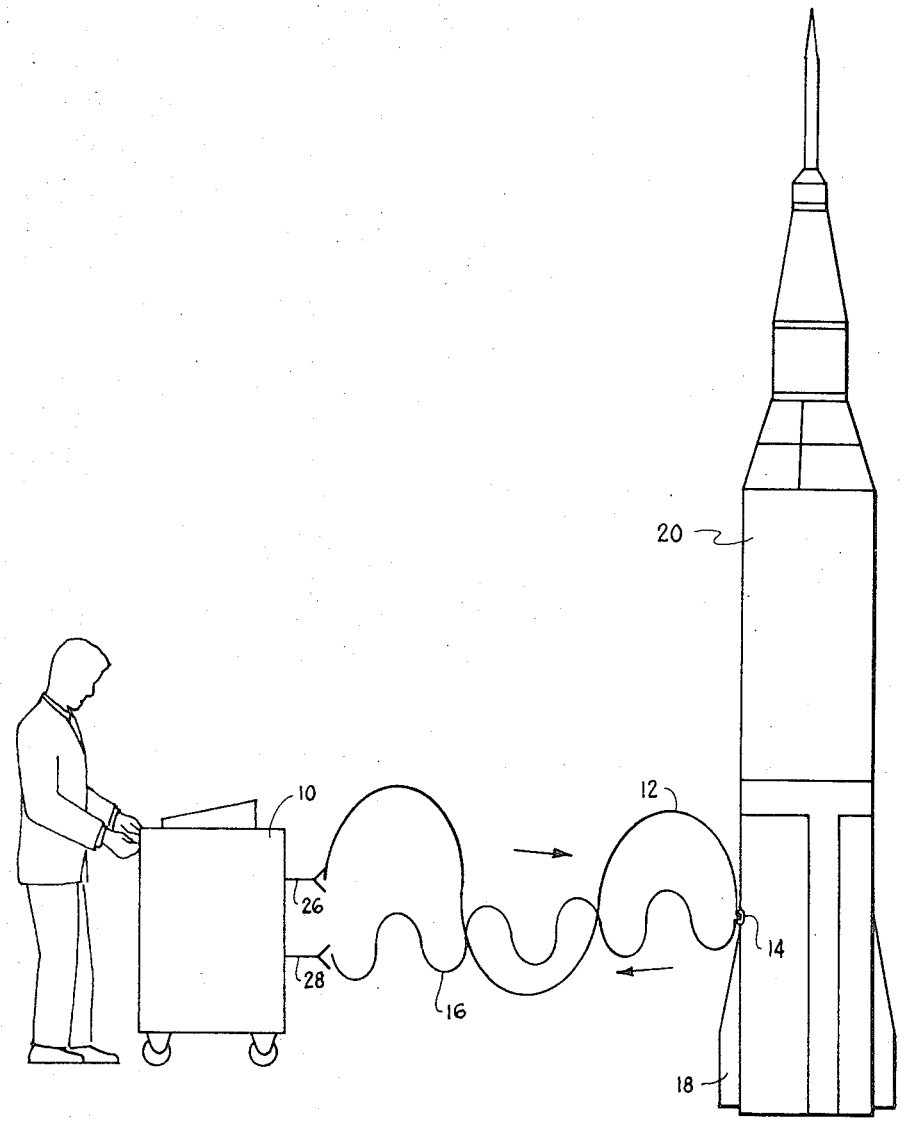

United States Patent [19] [11] 3,732,567
Low et al. [45] May 8, 1973

[54] JUNCTION RANGE FINDER

[76] Inventors: George M. Low, Deputy Administrator of the National Aeronautics and Space Administration with respect to an invention of; Sarto Morissette, Thetford Mines, Quebec, Canada; Ronald G. Sea, Newport Beach, Calif.; Marvin J. Frazier, Wood Dale, Ill.

[22] Filed: Sept. 21, 1970

[21] Appl. No.: 73,922

[52] U.S. Cl................343/14, 343/6.8 R, 343/17.5
[51] Int. Cl..................................................G01s 9/23
[58] Field of Search ................343/14, 5 SG, 6.5 R, 343/17.5, 6.8 R

[56] References Cited

UNITED STATES PATENTS

| | | | |
|---|---|---|---|
| 2,935,743 | 5/1960 | Glegg | 343/14 X |
| 3,079,557 | 2/1963 | Crabtree | 343/6.8 R X |
| 2,929,057 | 3/1960 | Green | 343/14 |
| 3,508,828 | 4/1970 | Froome | 343/14 X |
| 3,087,153 | 4/1963 | Richards | 343/6.5 R X |
| 3,444,509 | 5/1969 | Rubega et al. | 340/3 R |
| 2,907,023 | 9/1959 | Skinner | 343/14 |
| 3,217,322 | 11/1965 | Kabell et al. | 343/17.5 |
| 3,098,971 | 7/1963 | Richardson | 343/6.8 R |

Primary Examiner—Benjamin A. Borchelt
Assistant Examiner—Harold Tudor
Attorney—James O. Harrell and John R. Manning

[57] ABSTRACT

An apparatus for locating an electrically nonlinear object and determining the distance to the object by transmitting an FM signal in the vicinity of the nonlinear object causing a signal of a higher harmonic to be reflected by the nonlinear object. A receiver is provided for receiving the higher harmonic reflected signal and comparing such with the initial exciting signal so as to produce a signal, the amplitude of which is directly proportional to the distance to the object.

2 Claims, 2 Drawing Figures

INVENTORS
MARVIN J. FRAZIER
SARTO MORISSETTE
RONALD G. SEA
BY
James O. Harrell
ATTORNEY INVENTORS
MARVIN J. FRAZIER
SARTO MORISSETTE
RONALD G. SEA
BY
James D. Harrell
ATTORNEY

JUNCTION RANGE FINDER

The invention described herein was made in performance of work under a NASA Contract and is subject to the provisions of Sections 305 of the National Aeronautics and Space Act of 1968, Public Law 85-568 (72 Stat. 435, 402 U.S.C.P. 2457).

The invention relates to an apparatus for locating electrically nonlinear objects which sometime occur at joints between metallic structures, and more particularly to produce a signal that is proportional to the distance between a station and the object.

Complex electronic systems which comprise a multiplicity of radiating transmitters and receivers can experience interference due to electrical nonlinearities in the immediate radiation environment of the system.

Often the immediate radiation environment of such an electronic system contains many metallic structures or objects. When two metallic surfaces make apparent physical contact, the electrical impedance of the contacting surface is quite often nonlinear.

Such nonlinear characteristics of objects can often cause incorrect information to be transmitted or interfere with the transmission of such information. In launching space vehicles and similar complicated electronic systems it is imperative that the signals being transmitted be received with a minimum of distortion and interference. The reasons for such is obvious in that such interference could possibly cause an incorrect command to be sent to the space vehicle.

It has been found that metallic objects comprised of two or more constituent parts, which have been fastened together non-ideally in the fabrication of the object can and often do possess nonlinear electrical characteristics.

These objects possessing this nonlinear characteristic have been found to reflect signals impinging thereon having frequencies of a higher harmonic, but mathematically related, to the exciting signal.

It has also been found that if a metallic object is located in the near environment of a system radiating radio frequency energy, the electromagnetic waves radiated by the system will cause currents which are linearly related to the electromagnetic wave to flow in the object. If the object is electrically nonlinear, as in the case of an assembled metallic object, the current which flows in the object will contain frequency components which were not in the original electromagnetic wave.

The current flowing in the object at the new frequencies cause an electromagnetic wave containing frequencies of a higher harmonic to be reflected from the object.

Interference thus created due to electrical nonlinearities in metallic objects in the near radiation environment of an electronic system is referred to in general terms as a nonlinear environment interference. Such interference can be quite severe for complex systems, and can seriously degrade the performance of such a system.

It is possible to materially reduce the interference generated by nonlinear environment by locating the structure or objects which are nonlinear and modifying the structure to eliminate the nonlinear contacts.

In accordance with the present invention, it has been found that the difficulties encountered with electrically nonlinear objects may be overcome by locating and correcting such using an apparatus constructed in accordance with the present invention. This apparatus includes the following basic parts: (1) a generator for generating a frequency modulating exciting signal of a predetermined fundamental frequency, (2) a transmitting means for transmitting the exciting signal in the vicinity of a nonlinear object for causing a signal of a higher harmonic to be reflected by the nonlinear object, (3) a receiver for receiving the higher harmonic reflected signal, (4) a filter means coupled to the receiver for passing a predetermined harmonic portion of the received signal, (5) means coupled to the generating means for multiplying the exciting signal in order to produce a signal of the same frequencies as the signal passed by the filter means, (6) a first mixer for mixing the multiplied excited signal with the filtered reflected signal in order to produce a combined signal, (7) amplifier means for amplifying the combined signal and, (8) a discriminator coupled to the output of the amplifying means for producing a signal having an amplitude directly proportional to the distance to the nonlinear object.

Accordingly, it is an important object of the present invention to provide an apparatus for locating electrically nonlinear objects.

Another important object of the present invention is to provide an apparatus for generating a signal and receiving a signal of a higher harmonic so as to compare the two signals in order to generate a composite signal, the amplitude of which is proportional to the distance to the nonlinear object.

Figure 2:
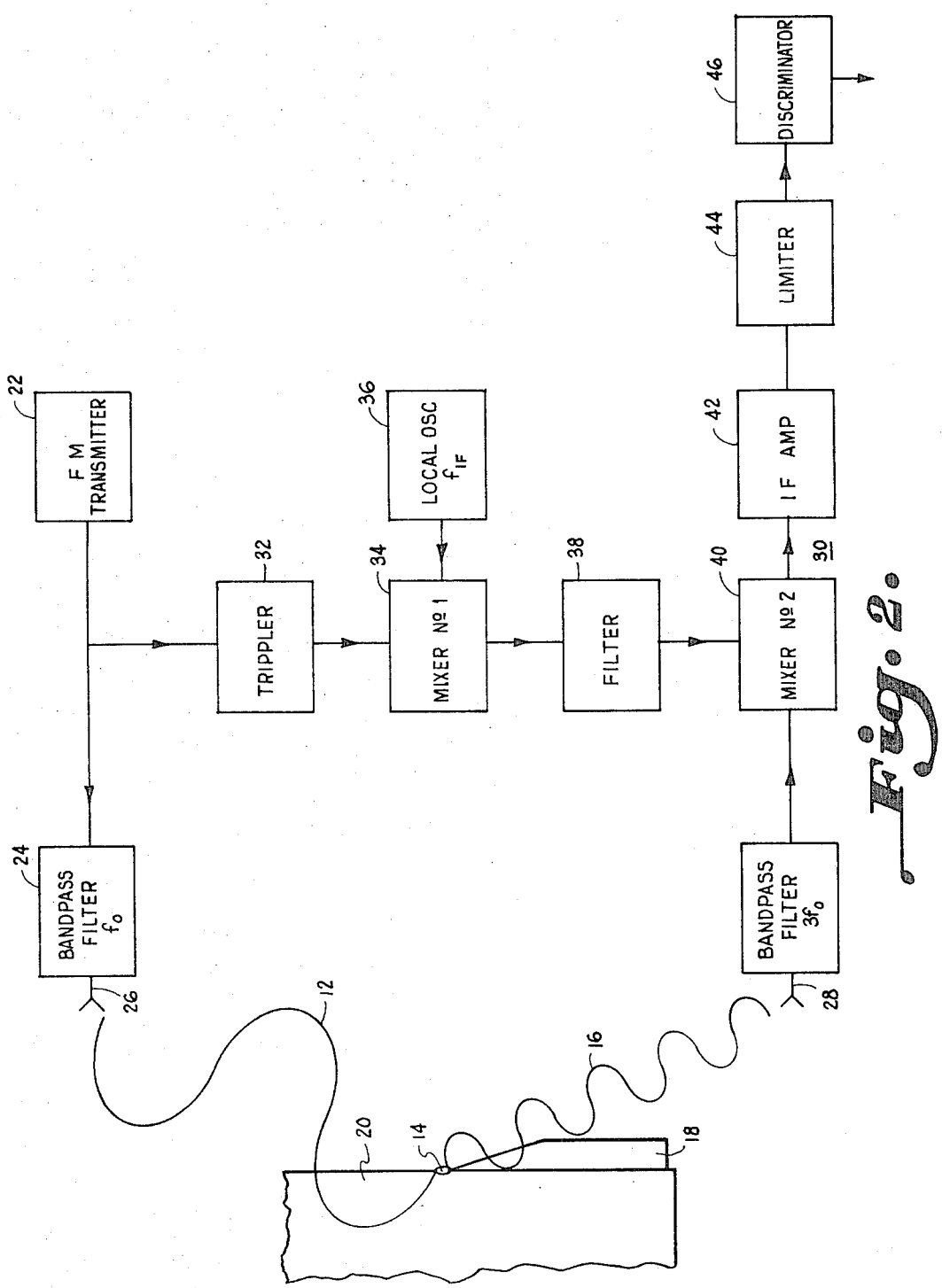

Other objects and advantages of this invention will become more apparent from a reading of the following detailed description and appended claims, taken in conjunction with the accompanying drawings wherein:

FIG. 1 is a schematic diagram showing the exciting wave being transmitted in the vicinity of a nonlinear object and a reflected harmonic wave being received from the sending station, and FIG. 2 is a block diagram illustrating an apparatus for locating electrically nonlinear objects.

Referring in more detail to FIG. 1 of the drawings, the apparatus can be constructed to be portable so that it can be moved manually into the vicinity where it is desired to detect junctions that are electrically nonlinear. As can be seen, the apparatus 10 transmits an exciting signal 12 which, when reflected by a junction 14 that is electrically nonlinear produces an electromagnetic wave 16 that is of a higher harmonic than the exciting wave. In the particular example illustrated in FIG. 1, the junction possessing the electrically nonlinear characteristics is located where the fin 18 of a missile 20 joins the main body thereof. After the junction has been detected and located it can be modified to correct the nonlinear characteristics by changing the manner in which the two pieces of metal are joined.

The technique utilized in the subject invention is similar to that employed in the CW-FM radar altimitry. However, in the altimitry application the receiver responds to energy which is back scattered from all objects within the antenna beam. The back scattered energy is at the same frequency as the transmitted signal from the FM source. The apparatus constructed in accordance with the present invention is only concerned with detecting energy which is at a frequency different from that being transmitted which is a characteristic of the reflected wave from an electrically non-linear junction. Altimiters and radar systems illustrating circuitry similar to that referred to above are disclosed in U.S. Pat. No. 2,929,057 granted to Green on Mar. 15, 1960, and U.S. Pat. No. 3,217,322 granted to Kabell et al. on Nov. 9, 1965.

Referring in more detail to FIG. 2 of the drawings, an FM transmitter 22 generates a wave defined by the equation $v_t(t) = v_t \sin [w_o t + (\beta/2fm) \sin w_m t]$, which is the common expression for frequency modulated wave of modulated frequency $fm = wm/2\pi$. The carrier frequency is $f_o = wo/2\pi$, and the total frequency excursion is given by $\beta$. The signal generated by the transmitter is passed through a bandpass filter 24 centered at $f_o$ and is then transmitted or radiated from the transmitting antenna 26 in order to eliminate any higher harmonics of $f_o$ produced in the transmitter.

Assuming a nonlinear structure is located at a range or distance R from the system antenna 26, the transmitted or exciting wave propagates to the nonlinear object in time $\tau/2 = R/c$, wherein $c$ is the velocity of light. Thus, the wave impinging on the object 14, such as illustrated in FIG. 1 is given by $$E_S(t) = A \sin [wo(t - \tau/2) + (\beta/2fm) \sin w_m(t - \tau/2)]$$

where (A) can be considered a constant for the present discussion. The exciting wave $E_S$ causes currents at the same frequency to flow in the majority of the vehicle structure 20, however, if the structure, such as the joint 14, is nonlinear currents at the harmonics of the above wave $E_S$ are produced; specifically, the subject invention is interested in the third harmonic current which is given by $$i_3(t) = B \sin [3w_o(t - \tau/2) + (3\beta/2fm) \sin wm(t - \tau/2)]$$

This current causes a wave linearly related to it to be radiated. This wave is sensed by a receiving antenna 28, however, due to the distance or range $R$, the received signal $v_r(t)$ is delayed another time increment $\tau/2 = R/c$. Thus, the received waveform is given by $$v_r(t) = H \sin [3w_o(t - \tau) + (3\beta/2fm) \sin w_m(t - \tau)]$$

wherein $H$ is a constant.

The following discussion is pertinent to the processing of the signal $v_r(t)$ in the receiver generally designated by the reference character 30 to obtain a signal indicative of the range from the sending station.

In addition to transmitting the signal produced by the FM transmitter 22, the signal is also fed to a tripler 32 combined in a mixer 34 with the output of a local oscillator 36 at a frequency $f_{IF}$, which is the IF frequency, and then sent through a filter 38 into a second mixer 40. The purpose of the tripler 32, the mixer 34, the local oscillator 36, and the filter 38 is to produce a signal $v_2$ which varies at the same frequencies as the reflected signal picked up by the antenna 28, but without the time delay. This is to enable the signal $v_2$ to be mixed in the mixer 40 with the reflected signal to produce a signal at the intermediate frequency suitable for amplification by the amplifier 42.

The block diagram shows the use of the frequency discriminator to extract the range information. A discriminator is used for this application rather than a frequency counter to circumvent the fixed error inherent in frequency counting schemes, which is deleterious for short range measurements.

In the following discussion, delays in circuit components will be ignored, since they would be calibrated out in a practical system. The trippler 32 output $v_1(t)$ is $$v_1(t) = \sin [3w_o t + (3\beta/2fm) \sin Wmt]$$

This signal $v_1(t)$ is combined in the first mixer 34 with the output of the local oscillator 36 signal to produce a signal $v_2(t)$ which is $$v_2(t) = \sin [(3w_o - W_{IF})t + (3\beta/2fm) \sin Wmt]$$

There are many other mixer output frequencies, however, the signal in $v_2(t)$ is selected by the filter which follows the mixer.

The signal in $v_2(t)$ is combined in the second mixer 40 with the received signal $v_R(t)$ to produce a mixer output centered at the IF frequency and given by $$v_3(t) = \cos [W_{IF}t - (3\beta/fm) \sin (Wm\tau/2) \cos w_m(t - \tau/2) - 3w_o\tau]$$

For the ranges of interest in this development, the target ranges are such that $\tau \ll 1/fm$. Therefore, $\sin(Wm\tau/2) = Wm\tau/2$ to a very good approximation, and $v_3(t)$ can be rewritten as $$v_3(t) = \cos [W_{IF}t - 3\pi\beta\tau\cos Wm(t - \tau/2)]$$

where the phase angle $3W_o\tau$ has been ignored. The last equation for $v_3(t)$ is a frequency modulated signal at the IF frequency. This signal is amplified to a convenient level by the IF amplifier 42; limited in a limiter to reduce unwanted amplitude modulation, and then impressed upon a frequency discriminator 46. The output of the discriminator is $$v_o(t) = 3\pi K\beta\tau \cos Wm(t - \tau/2)$$

Where $K$ is a constant dependent on the discriminator characteristics. Relation $v_o(t)$ is a signal at frequency $fm = Wm/2\pi$. For the purpose of the invention, the time delay in $v_o(t)$ is unimportant. The signal has an amplitude of $3\pi K\beta\tau$ which is directly proportional to the target or interference source range.

The amplitude of the output signal $v_o(t)$ can be measured by any suitable device, such as a volt meter, to extract the desired range information. Thus, by radiating a frequency modulated fundamental waveform, measurements made on a third harmonic reflected signal from a nonlinear interference source will yield a signal output whose amplitude is proportional to the range to the interference source. All normal scattered returns at the fundamental frequency are rejected and thus not utilized.

In some systems which experience interference due to the above mechanisms, the frequency of operation is sufficiently high to permit directional antennas to be used as an aid in locating environment nonlinearities which can contribute to the interference. However, often the environment is quite complex, and it is desirable to be able to assess the approximate range to a nonlinear structure in addition to the general direction obtained by the use of directional antennas.

In essence, the invention applies existing FM-CW techniques which are normally used primarily for altitude measurements, to the range determination of objects in the environment which are nonlinear. The difference in system implementation lies primarily in the fact that for a conventional FM-CW range measurement system, the received signal is at the same frequency as the transmitted signal, while for the nonlinearity locating scheme, the received signal is at a frequency which is different than that transmitted by nature of the conversion process in the nonlinearity. It is anticipated that the third harmonic of the transmitted signal would be the logical return frequency to monitor, however, a higher harmonic or an intermodulation product between two transmitted signals could be used instead.

What is claimed is:

1. Apparatus for locating an electrically nonlinear object comprising:
   A. means for generating a frequency modulated exciting signal of a predetermined fundamental frequency;
   B. a transmitting means for transmitting said exciting signal in the vicinity of said nonlinear object for causing a signal of a higher harmonic to be reflected by said nonlinear object;
   C. a means located in close proximity to said nonlinear object for receiving said higher harmonic reflected signal;
   D. filter means coupled to said receiving means for passing a predetermined harmonic portion of said received signal;
   E. means coupled to said generating means for multiplying said exciting signal to produce a signal of the same frequency as said signal reflected by said nonlinear object and filtered by said filter means;
   F. a first mixer for mixing said multiplied excited signal with said filtered reflected signal producing a combined signal;
   G. amplifier means for amplifying said combined signal,
   H. a discriminator coupled to the output of said amplifying means for producing a signal having an amplitude directly proportional to the distance to said nonlinear object, and
   I. a limiter interposed between said first mixer and said discriminator for reducing unwanted amplitude modulations.

2. The apparatus as set forth in claim 1, wherein said means coupled to said generating means for multiplying said exciting signal includes;
   A. a tripler coupled to said generating means for multiplying said exciting signal;
   B. a local oscillator; and
   C. a second mixer coupled to said tripler and oscillator for mixing the output of said local oscillator with the output of said tripler.

* * * * *